April 29, 1952  R. H. GODDARD  2,594,766

APPARATUS FOR STEERING AIRCRAFT

Filed Nov. 30, 1946

INVENTOR.
Robert H. Goddard, Dec'd.
Esther C. Goddard, Executrix
BY
Chas. T. Hawley
ATTY.

Patented Apr. 29, 1952

2,594,766

UNITED STATES PATENT OFFICE 2,594,766

APPARATUS FOR STEERING AIRCRAFT

Robert H. Goddard, deceased, late of Annapolis, Md., by Esther C. Goddard, executrix, Worcester, Mass., assignor of one-half to The Daniel and Florence Guggenheim Foundation, New York, N. Y., a corporation of New York Application November 30, 1946, Serial No. 713,312

1 Claim. (Cl. 244—75)

This invention relates to the steering of aircraft and particularly to the steering of rocket craft under different atmospheric and operating conditions.

It is the general object of the invention to provide improved means for steering an aircraft while coasting at very high speed, and to provide coacting means for steering the craft in powered flight.

More specifically, an aircraft is provided in which the front end portion of the craft may be angularly displaced relative to the body portion. In the preferred construction, the rear end portion of the aircraft is similarly displaceable.

Displacement of the front end portion is preferably utilized for steering when coasting at very high speeds, and displacement of the rear end portion for steering in powered flight.

The invention further relates to arrangements and combinations of parts which will be hereinafter described and more particularly pointed out in the appended claim.

A preferred form of the invention is shown in the drawings, in which

Figure 1:
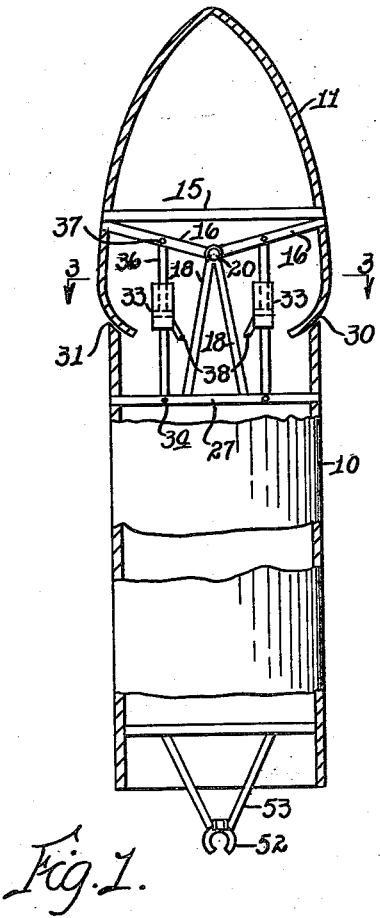
Fig. 1 is a partial plan view, partly in section, showing the front and middle portions of an aircraft embodying this invention.
Figure 2:
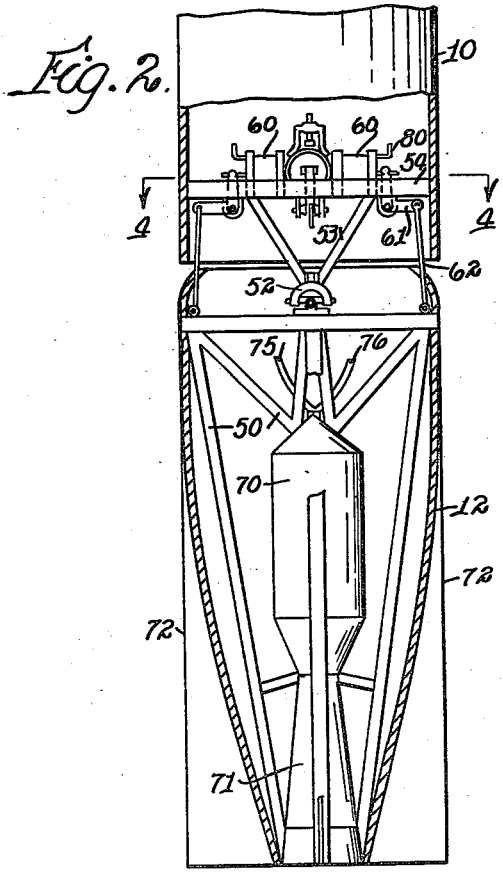
Fig. 2 is a similar view showing the middle and rear portions of the aircraft.
Figure 3:
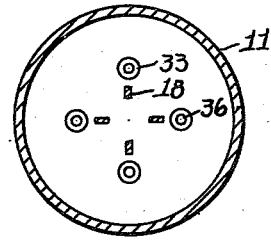
Fig. 3 is a sectional end view, taken along the line 3—3 in Fig. 1.

Referring to the drawings, an aircraft is shown having a body portion 10, a front portion 11 and a rear portion 12. The front portion 11 (Figs. 1 and 3) is provided with internal frame members 15 and 16 which firmly support the streamlined outer casing and which are connected to frame members 18 in the body portion 10 by a universal or spherical bearing 20..

Figure 5:
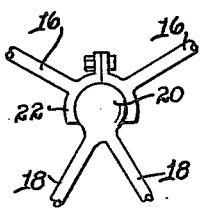
Fig. 5 is a detail sectional view of certain supporting structure.
Figure 4:
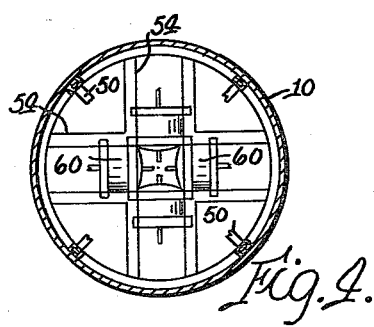
Fig. 4 is a similar view, taken along the line 4—4 in Fig. 2.

The frame members 16 (Fig. 5) may be provided with recessed bearing portions 22 drawn together by a bolt 24 and embracing somewhat more than one-half of the spherical surface of the bearing 20, thus permitting universal angular or swivel adjustment of the front end portion 11 relative to the body portion 10. Under certain conditions, it may be desirable to substitute the double-gimbal type of universal bearing shown in the prior Goddard Patent No. 2,396,568 for the spherical connection above described.

The supporting members 18 are fixed to cross frame members 27 (Fig. 1) which in turn are firmly secured within the body portion 10. The annular rear edge 30 of the front portion 11 is curved inwardly on a radius struck from the swivel bearing 20 as a center, and the annular front edge 31 of the body portion 10 is beveled to provide slight clearance for the curved rear edge 30. The over-all diameter of the body portion 10 is preferably slightly less than the over-all diameter of the front portion 11 to reduce air resistance.

Fluid-operated cylinders 33 are supported by swivel bearings 34 on the cross frame 27 and are provided with pistons having piston rods 36 with swivel connections 37 to the frame members 16 in the front portion 11. It will be noted from Fig. 3 that opposed operating cylinders 33 are provided in two or more angularly disposed planes, so that the front portion 11 may be angularly displaced in any desired direction by energizing selected cylinders 33.

When the front portion 11 is thus displaced, the pressure of the atmosphere against the said front portion will displace the craft from straight-line flight in any desired direction. This will take place even when the craft is travelling at high altitudes and at very high speed and with the power shut off so that the craft is coasting.

Fluid pressure may be applied selectively to the cylinders 33 through pipes 38 (Fig. 1), and the admission of fluid to selected cylinders may be either manually or automatically controlled, as described in the prior patent above noted and in prior Goddard Patent No. 2,183,311. The details of such control devices form no part of the present invention.

The rear portion 12 of the aircraft may be constructed as shown in prior Goddard Patent No. 2,396,568 and comprises a rearwardly tapered casing mounted on a frame structure 50 and having a swivel connection 52 by which the rear portion 12 is connected to frame members 53 mounted on a cross frame 54 secured in the rear part of the body portion 10.

Bellows operators 60 are connected by bell cranks 61 and links 62 to the frame structure 50 of the rear portion 12. By selectively activating the bellows operators 60 the rear portion 12 may be angularly displaced in a desired direction. A combustion chamber 70 and conical discharge nozzle 71 are provided in the rear portion 12, and vanes 72 may be added for more effective steering. The combustion chamber 70 receives combustion elements through feed pipes 75 and 76 supplied from pressure tanks, not shown.

Feed pipes 80 supply fluid under pressure to the bellows operators 60 and the admission of such fluid is selectively controlled.

For a more complete description of the details of construction of the actuating devices for displacing the rear portion 12 of the aircraft, reference is made to Goddard Patent No. 2,396,568.

Steering by angular displacement of the rear portion 13 is desirable and effective when the aircraft is in powered flight and when the combustion chamber 70 is discharging a substantial volume of combustion gases through the discharge nozzle 17. When the aircraft is coasting, however, the steering efficiency of such angular displacement of the rear portion 12 is greatly reduced, and much more satisfactory results are attained by displacement of the front portion 11.

By combining an angularly displaceable front portion for steering an aircraft when coasting, and an angularly displaceable rear portion for steering an aircraft when under power, the aircraft is at all times under satisfactory control, and changes or corrections in the path of flight may be quickly and easily made. To meet extreme conditions, such as flight in a relatively small circle, an augmented steering reaction may be attained by angularly displacing both the front and the rear portions at the same time.

Having been thus described, the invention is not to be limited to the details herein disclosed, otherwise than as set forth in the claim, but what is claimed is:

A rocket craft comprising a closed casing having a rigid cylindrical body portion, a rigid and substantially conical front end casing portion and a rear casing portion, swivel supports for said front end casing portion on said body portion, and a plurality of fluid-operated thrust devices equally spaced circumferentially within said closed casing and interposed between a fixed support in said body portion and cross arms in said front end casing portion, said thrust devices being operative in diametrically opposed coacting pairs, and said pairs being selectively effective by direct axial operation to change the angular relation between said fixed support and the cross arms in said front end casing portion to which said thrust devices are connected, and to thereby angularly displace said front end casing portion relative to said body portion to accomplish steering of said rocket craft.

ESTHER C. GODDARD,
*Executrix of the Last Will and Testament of Robert H. Goddard, Deceased.*

REFERENCES CITED

The following references are of record in the file of this patent:

UNITED STATES PATENTS

| Number | Name | Date |
| --- | --- | --- |
| 1,109,891 | Young | Sept. 8, 1914 |
| 1,275,233 | Ellinger | Aug. 13, 1918 |
| 2,369,859 | Sargeant | Feb. 20, 1945 |
| 2,396,568 | Goddard | Mar. 12, 1946 |
| 2,457,391 | Mitchell | Dec. 28, 1948 |